US010788623B2

(12) United States Patent
Boutami

(10) Patent No.: US 10,788,623 B2
(45) Date of Patent: Sep. 29, 2020

(54) OPTICAL DEVICE

(71) Applicant: COMMISSARIAT A L'ENERGIE ATOMIQUE ET AUX ENERGIES ALTERNATIVES, Paris (FR)

(72) Inventor: Salim Boutami, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 16/308,277

(22) PCT Filed: Jun. 8, 2017

(86) PCT No.: PCT/EP2017/063934
§ 371 (c)(1),
(2) Date: Dec. 7, 2018

(87) PCT Pub. No.: WO2017/211936
PCT Pub. Date: Dec. 14, 2017

(65) Prior Publication Data
US 2019/0265407 A1 Aug. 29, 2019

(30) Foreign Application Priority Data
Jun. 10, 2016 (FR) ..................... 16 55396

(51) Int. Cl.
G02B 6/122 (2006.01)
G02B 6/136 (2006.01)
(Continued)

(52) U.S. Cl.
CPC ........... G02B 6/122 (2013.01); G02B 6/1223 (2013.01); G02B 6/136 (2013.01); G02B 6/241 (2013.01);
(Continued)

(58) Field of Classification Search
CPC ...... Y10S 977/761; G02B 2006/12109; G02B 6/136; G02B 2006/12176
See application file for complete search history.

(56) References Cited

U.S. PATENT DOCUMENTS

2004/0042753 A1 3/2004 Steenblik et al.
2005/0147145 A1 7/2005 Behfar et al.
(Continued)

OTHER PUBLICATIONS

International Search Report dated Aug. 7, 2017 in PCT/EP2017/063934 filed Jun. 8, 2017.
(Continued)

Primary Examiner — Omar R Rojas
(74) Attorney, Agent, or Firm — Oblon, McClelland, Maier & Neustadt, L.L.P.

(57) ABSTRACT

An optical device including: a waveguide, including a core having a refractive index, for guiding a quasi monochromatic light radiation, of a central wavelength, in a first direction and transmitting the radiation through an exit facet of the waveguide to the external environment according to a transmission coefficient, the exit facet being substantially perpendicular to the first direction, a filter blade, for example an air blade, disposed in the waveguide, parallel to the exit facet and at a first non-zero distance from the exit facet, the filter blade having, in the first direction, a first thickness, the first distance and the first thickness configured so that the transmission coefficient of the waveguide is equal to a first transmission coefficient at the central wavelength.

14 Claims, 3 Drawing Sheets

(51) Int. Cl.
*G02B 6/24* (2006.01)
*G02B 6/10* (2006.01)
*G02B 6/12* (2006.01)

(52) U.S. Cl.
CPC .... *G02B 6/102* (2013.01); *G02B 2006/12109* (2013.01); *G02B 2006/12176* (2013.01)

(56) References Cited

U.S. PATENT DOCUMENTS

| | | | |
|---|---|---|---|
| 2005/0226283 A1 | 10/2005 | He | |
| 2006/0098929 A1 | 5/2006 | Steenblik et al. | |
| 2006/0140569 A1* | 6/2006 | McDonald | H01S 5/0265 385/129 |
| 2007/0263973 A1* | 11/2007 | Van Laere | G02B 6/124 385/129 |
| 2008/0019652 A1 | 1/2008 | Steenblik et al. | |
| 2011/0032967 A1 | 2/2011 | Behfar et al. | |
| 2013/0084038 A1 | 4/2013 | Takemura et al. | |

OTHER PUBLICATIONS

Yee, K. S., "Numerical Solution of Initial Boundary Value Problems involving Maxwell's Equations in Isotropic Media," IEEE Transactions on Antennas and Propagation, vol. 14, No. 3, 1966, pp. 302-307.

Aellen, T. et al., "Continuous-wave distributed-feedback quantum-cascade lasers on a Peltier cooler," Applied Physics Letters, vol. 83, 2003, pp. 1929-1931 (pp. No. 1-3).

Li, Z. et al., "Resonant cavity based compact efficient antireflection structures for photonic crystals; Compact antireflection structures for photonic crystals," Journal of Physics D: Applied Physics, vol. 40, No. 19, Oct. 7, 2007 (XP20111930), pp. 5873-5877.

U.S. Appl. No. 15/279,955, filed Sep. 29, 2016, US 2017/0097301 A1, Anthony Lefebvre, et al.

U.S. Appl. No. 15/660,251, filed Jul. 26, 2017, US 2018/0039024 A1, Salim Boutami, et al.

U.S. Appl. No. 15/867,215, filed Jan. 10, 2018, US 2018/0204974 A1, Salim Boutami, et al.

U.S. Appl. No. 15/978,481, filed May 14, 2018, US 2018/0335568 A1, Karim Hassan, et al.

U.S. Appl. No. 16/030,887, filed Jul. 10, 2018, Salim Boutami, et al.

U.S. Appl. No. 16/026,535, filed Jul. 3, 2018, Boris Taurel, et al.

U.S. Appl. No. 16/110,757, filed Aug. 23, 2018, Karim Hassan, et al.

U.S. Appl. No. 16/141,414, filed Sep. 25, 2018, Karim Hassan, et al.

U.S. Appl. No. 16/156,139, filed Oct. 10, 2018, Salim Boutami, et al.

U.S. Appl. No. 16/167,972, filed Oct. 23, 2018, Salim Boutami, et al.

\* cited by examiner

OPTICAL DEVICE

TECHNICAL FIELD

The invention relates to a method for manufacturing a filter for a waveguide. More particularly, the invention relates to a method for modifying the transmission coefficient of quasi-monochromatic radiation by a waveguide.

The invention further relates to an optical device comprising a waveguide and a filter blade intended to modify the transmission coefficient of said waveguide.

PRIOR ART

A waveguide 1, known in the prior art, and shown in FIG. 1, comprises a core 2, having a refractive index $n_c$, inserted between two cladding layers 3 and 4 having a refractive index $n_g$ that is less than $n_c$.

During operation, the waveguide 1 guides light radiation, having a quasi-monochromatic central wavelength $\lambda$, in a first direction A and through an exit facet 5 of the waveguide 1.

However, the passage of the light radiation through the exit facet 5 to the external environment (in this case air) is only partial (the quantity of light radiation effectively transmitted to the external environment is characterised by a transmission coefficient T), and said light radiation is partially reflected by the exit facet 5. This reflection of the light radiation on the exit facet 5 of the waveguide 1 is imposed by the difference between the effective refractive index of the mode (referenced $n_{eff}$) propagating in the waveguide 1 and the refractive index of the external environment. (In this respect, a person skilled in the art will find a detailed description of the concept of the "effective refractive index of the mode" in the document [1]). In other words, the transmission coefficient T of the waveguide is imposed by the difference between the effective refractive index of the mode and the refractive index of the external environment.

This reflection phenomenon on the exit facet 5 is, in many scenarios, qualified as a spurious reflection and is thus uncontrolled.

Moreover, circumstances exist wherein this phenomenon can be the source of optical signal losses, thus deteriorating the performance levels of the optical devices comprising such waveguides, and more particularly of devices with photonic integrated circuits.

The document [2] thus proposes a method for controlling the transmission coefficient of the waveguide by forming a filter layer 6 on the exit facet 5. More particularly, the technical objective of the document [2] is to reduce the undesired reflection phenomenon. According to the document [2], the filter layer 6 comprises at least one dielectric or semi-conductive material (referred to as the "filter material"), and has a refractive index $n_{filter}$, and a thickness $E_{filter}$, referred to as the "quarter wave thickness", defined by the following equations (1) and (2):

$$n_{filter} = \sqrt{n_{eff} n_0} \quad (1)$$

$$E_{filter} = \frac{\lambda}{4\sqrt{n_{eff} n_0}} \quad (2)$$

In the equations (1) and (2), $\lambda$ is the wavelength of the light radiation, $n_{eff}$ is the effective refractive index of the mode, and $n_0$ is the refractive index of the external environment (for example the refractive index of air).

This solution theoretically allows the transmission coefficient of the waveguide 1 to be adapted. More particularly, provided that it satisfies the equations (1) and (2), the filter layer 6 constitutes a non-reflective filter, reducing the undesired reflections at the exit facet 5 and increasing the transmission T.

A silicon nitride-based filter material is conventionally used provided that the waveguide has a semi-conductive base. More specifically, the silicon nitride has a refractive index that is close to 2. Moreover, the silicon nitride is relatively transparent in the visible and short-wavelength infrared ranges (i.e. for wavelengths that lie in the range 0.3 to 7 μm).

Although the document [2] only addresses problems associated with spurious reflections, it falls within the wider problematic of controlling and/or modifying the transmission coefficient T of a waveguide 1.

However, this method proposed in the document [2] is not satisfactory. More specifically, this method requires finding a filter material that has a refractive index that satisfies the equation (1), for example, at the wavelength of the light radiation.

Furthermore, the filter materials can have a non-zero absorption coefficient at the wavelength of the light radiation guided by the wavelength. In particular in the mid-wavelength infrared range (between 3 and 8 μm) and long-wavelength infrared range (between 8 and 14 μm), the filter materials capable of having a refractive index that satisfies the equation (1) are generally very absorbent. More specifically, the imaginary part of the refractive index (the imaginary part of the refractive index is proportional to the absorption coefficient) of silicon nitride is greater than 1 in the mid-wavelength infrared and long-wavelength infrared ranges. Thus, when a waveguide 1 is to be used in the mid-wavelength infrared or long-wavelength infrared ranges, the filter proposed in the document [2] becomes too absorbent, and thus cannot be used.

Moreover, this method is based on a technique of forming thin films of dielectric and/or semi-conductive materials on the sides of the waveguide or of the optical device. However, said sides constitute chemically heterogeneous surfaces (as a result of the presence of the core and the cladding of the waveguide), and thus make the formation of thin films difficult to control in terms of the thickness and chemical homogeneity thereof.

The purpose of the invention is thus to propose an optical device comprising a waveguide provided with a filter, the refractive index whereof is not imposed by the effective refractive index of the mode guided by said waveguide.

Another purpose of the invention is to propose an optical device comprising a waveguide provided with a filter having improved chemical homogeneity.

Another purpose of the invention is to propose an optical device comprising a waveguide provided with a filter that is also compatible with applications in the mid-wavelength infrared and long-wavelength infrared ranges.

DESCRIPTION OF THE INVENTION

The purposes of the invention are at least partially achieved by an optical device comprising:

a waveguide 10, comprising a core 20 having a refractive index $n_c$ for guiding quasi-monochromatic light radiation, of a central wavelength $\lambda$, in a first direction A and transmitting said radiation through an exit facet 50 of the waveguide 10 to the external environment according to a transmission coefficient T, the exit facet 50 being substantially perpendicular to the first direction A, a filter blade 60, advantageously an air blade, arranged in the waveguide 10, parallel to the exit facet 50 and at a first non-zero distance $e_{slab}$ from said exit facet 50, the filter blade 60 having, in the first direction A, a first thickness $e_{slit}$, the first distance $e_{slab}$ and the first thickness $e_{slit}$ being adapted so that the transmission coefficient T of the waveguide 10 is equal to a first transmission coefficient $T_1$ at the central wavelength λ.

Thus, the device according to the invention simplifies the manufacture of the filter blade relative to the prior art. More specifically, the device according to the invention does not require any thin film deposition. Thus, the problem concerning the inhomogeneity of the thickness or chemical composition of the thin films is no longer posed within the scope of this invention.

Moreover, the filter blade can be made of air or of a vacuum and can be suitable for providing the waveguide, as a function of the magnitudes $e_{slit}$ and $e_{slab}$, with the entire transmission coefficient T range that lies between 100% and values close to 0% (for example 1%). In other words, for each value of the transmission coefficient T that lies in the range 100% to values close to 0%, there is a pair of values $e_{slit}$ and $e_{slab}$ associated with the filter blade. The problem concerning finding a material with a refractive index specific to an application at a given wavelength is therefore no longer posed.

Furthermore, the use of a filter blade made of air or of a vacuum paves the way for applications in the mid-wavelength infrared and long-wavelength infrared ranges.

According to one embodiment, the waveguide is a planar waveguide, the core whereof is a layer inserted between two cladding layers, each of which comprises a cladding material having a refractive index $n_g$ that is less than $n_c$.

According to one embodiment, the core comprises a first cross-section $S_{c1}$ along a plane that is orthogonal to the first direction A, whereby the filter blade is substantially parallel to the first cross-section $S_{c1}$, and covers at least said first cross-section $S_{c1}$; advantageously the filter blade also extends into the two cladding layers.

According to one embodiment, the core extends over a length L that is parallel to the first direction A, and has a second cross-section $S_{c2}$, rectangular in shape, whereby the core is surrounded by a cladding material having a refractive index $n_g$ that is less than $n_c$.

According to one embodiment, the filter blade is substantially parallel to the second cross-section $S_{c2}$, and covers at least said second cross-section $S_{c2}$; advantageously the filter blade also extends into the cladding material.

According to one embodiment, the waveguide is a single-mode waveguide.

According to one embodiment, the waveguide is a laser.

The invention further relates to a method for manufacturing an optical device comprising the steps of:

forming a waveguide, the waveguide comprising a core having a refractive index $n_c$, for guiding quasi-monochromatic light radiation, of a central wavelength λ, in a first direction A and transmitting said radiation through an exit facet of the waveguide to the external environment according to a transmission coefficient T, the exit facet being substantially perpendicular to the first direction A, forming a filter blade, advantageously an air blade, in the waveguide, parallel to the exit facet and at a first non-zero distance $e_{slab}$ from said exit facet, the filter blade having, in the first direction A, a first thickness $e_{slit}$, the first distance $e_{slab}$ and the first thickness $e_{slit}$ being adapted so that the transmission coefficient T of the waveguide is equal to a first transmission coefficient $T_1$ at the central wavelength λ.

Thus, the method according to the invention simplifies the manufacture of the filter blade relative to the prior art. More specifically, the method according to the invention does not require any thin film deposition. Thus, the problem concerning the inhomogeneity of the thickness or chemical composition of the thin films is no longer posed within the scope of this invention.

Moreover, the filter blade can be made of air or of a vacuum and can be suitable for providing the waveguide, as a function of the magnitudes $e_{slit}$ and $e_{slab}$, with the entire transmission coefficient T range that lies between 100% and values close to 0% (for example 1%). In other words, for each value of the transmission coefficient T that lies in the range 100% to values close to 0%, there is a pair of values $e_{slit}$ and $e_{slab}$ associated with the filter blade. The problem concerning finding a material with a refractive index specific to an application at a given wavelength is therefore no longer posed.

Furthermore, the use of a filter blade made of air or of a vacuum paves the way for applications in the mid-wavelength infrared and long-wavelength infrared ranges.

According to one embodiment, the formation of the filter blade is preceded by a step of selecting the first transmission coefficient $T_1$ from among a first set of values of transmission coefficients T, the first set of values of transmission coefficients T being determined according to a set of values of first thicknesses $e_{slit}$ of the filter blade and a set of first distances $e_{slab}$ of the filter blade relative to the exit facet, the first set of values of transmission coefficients T being advantageously determined by a calculation.

According to one embodiment, the core comprises a first cross-section S, along a plane that is orthogonal to the first direction A, whereby the filter blade is substantially parallel to the cross-section $S_c$, and covers at least said cross-section $S_c$.

According to one embodiment, the first transmission coefficient $T_1$ is greater than a transmission coefficient $T_d$ of the waveguide devoid of the filter blade.

According to one embodiment, the first transmission coefficient $T_1$ is greater than 80%, preferably greater than 90%.

According to one embodiment, the waveguide is a planar waveguide, the core whereof is a layer inserted between two cladding layers, each of which comprises a cladding material having a refractive index $n_g$ that is less than $n_c$.

According to one embodiment, the core comprises a first cross-section Sc1 along a plane that is orthogonal to the first direction A, whereby the filter blade is substantially parallel to the first cross-section $S_{c1}$, and covers at least said first cross-section $S_{c2}$; advantageously the filter blade also extends into the two cladding layers.

According to one embodiment, before forming the filter blade, the core extends over a length L that is parallel to the first direction A, and has a second cross-section $S_{c2}$, rectangular in shape, whereby the core is surrounded by a cladding material having a refractive index $n_g$ that is less than $n_c$.

According to one embodiment, the filter blade is substantially parallel to the second cross-section $S_{c2}$, and covers at least said second cross-section $S_{c2}$; advantageously the filter blade also extends into the cladding material.

BRIEF DESCRIPTION OF THE FIGURES

This invention will be better understood upon reading the following description with reference to the accompanying figures, in which.

DETAILED DESCRIPTION OF THE SPECIFIC EMBODIMENTS

Figure 1:
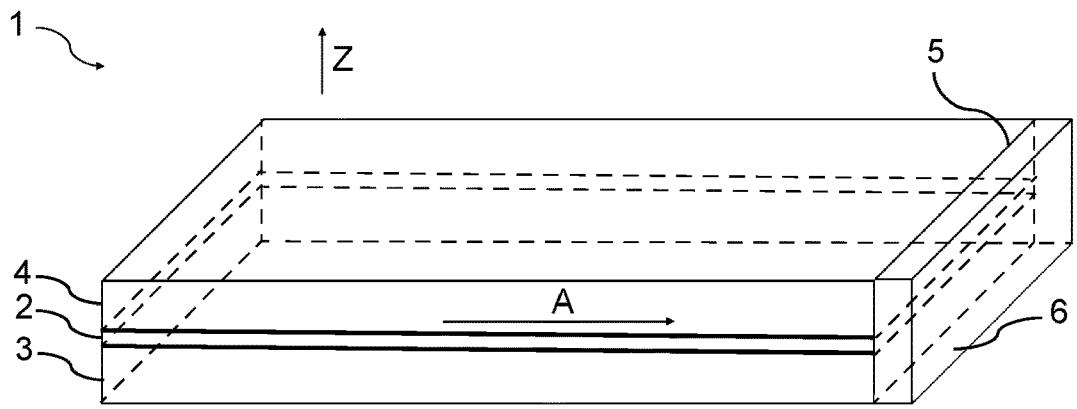
FIG. 1 is a diagram showing a perspective view of a waveguide provided with a known non-reflective filter of the prior art.

The invention described in detail hereafter implements the formation of a filter comprising a filter blade in a waveguide. The filter blade is arranged in the path of light radiation guided by the waveguide, and is intended to modify the transmission coefficient of the waveguide. In this respect, the description will more clearly show that both the thickness of the filter blade and the arrangement thereof in the waveguide allow the transmission coefficient of the waveguide to be adjusted for radiation of a given wavelength.

For simplicity purposes, the same reference numerals will be used in the description of the different embodiments for identical elements or elements performing the same function.

FIGS. 4 to 8 show example implementations of a method of manufacturing a filter for a waveguide.

The method of manufacturing a filter for a waveguide 10 comprises a first step of supplying a waveguide 10.

The waveguide 10 can be a planar waveguide 10 or a ridge waveguide 10.

The planar or ridge waveguide 10 is intended to guide quasi-monochromatic light radiation, having a central wavelength), in a first direction A. It should be noted that the first direction A is not necessarily rectilinear.

Quasi-monochromatic light radiation is understood herein to be light radiation comprising an extended spectral band $\Delta\lambda < \lambda/10$ centred about a central wavelength $\lambda$.

Advantageously, the light radiation can be monochromatic with a wavelength $\lambda$ (in this case, the central wavelength $\lambda$ is considered to be the wavelength $\lambda$ of the monochromatic radiation).

Advantageously, the central wavelength $\lambda$ can lie in the range 0.4 µm to 14 µm, preferably in the range 3 µm to 14 µm.

The wavelength ranges 3 µm-8 µm and 8 µm-14 µm are respectively referred to as the Mid-Wavelength InfraRed or MWIR and Long-Wavelength InfraRed or LWIR ranges.

Figure 2:
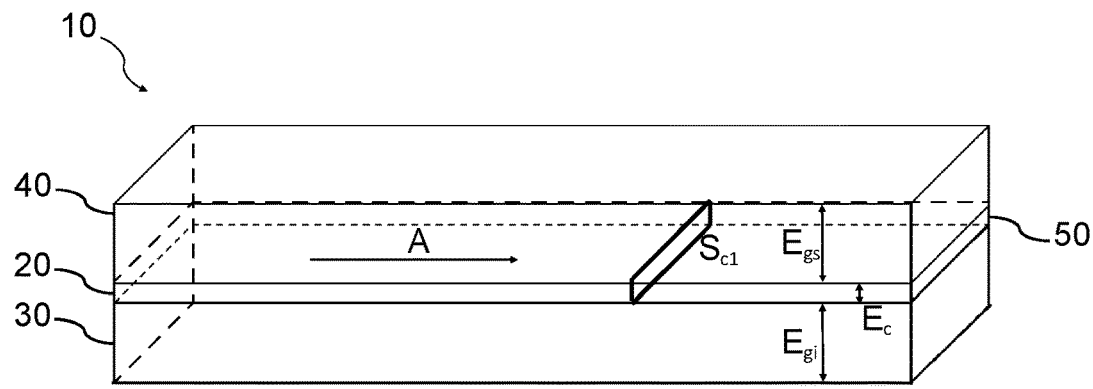
FIG. 2 is a diagram showing a perspective view of a known planar waveguide of the prior art comprising a core layer inserted between two cladding layers.

The planar waveguide 10 (shown in FIG. 2) is understood herein to be a waveguide 10 comprising a core layer 20 inserted between two cladding layers 30 and 40. In the description below, the term "core 20" is used to denote the core layer 20. The term "cladding 31" is also used to denote the two cladding layers 30 and 40 (this notion is also extended to the ridge waveguide for which the ridge is surrounded by a cladding). The core 20 of the planar waveguide 10 comprises a first cross-section $S_{c1}$ along a plane that is orthogonal to the first direction A. The core 20 of the waveguide has a thickness $E_c$, the cladding layer 30 has a thickness $E_g$, and the cladding layer 40 has a thickness $E_{gs}$. The thickness of a layer is understood herein to be the thickness in the direction perpendicular to the plane formed by the layer. More specifically and with reference to FIG. 1, the thickness of a layer is taken in the direction Z.

Figure 3:
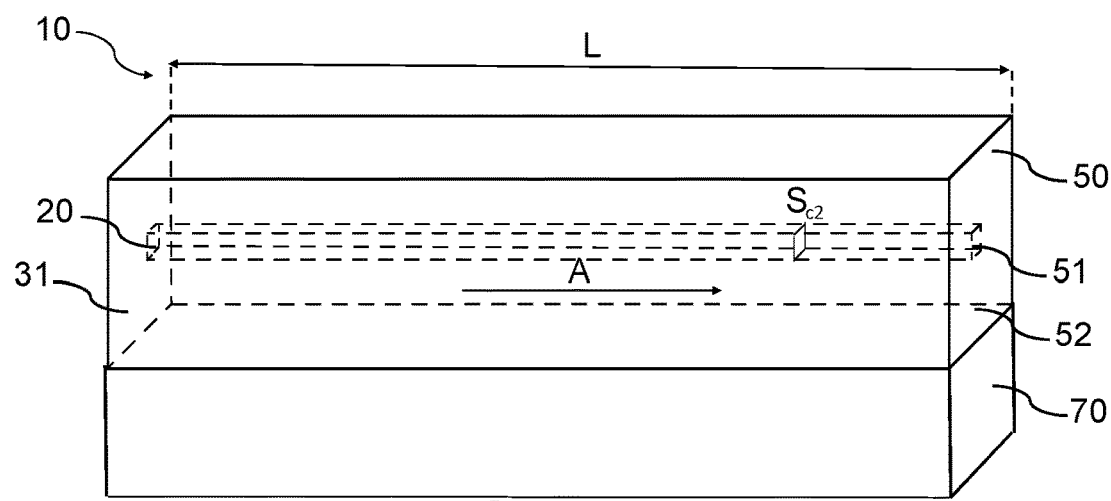
FIG. 3 is a diagram showing a perspective view of a known ridge waveguide of the prior art comprising a core (in the shape of a ridge) and surrounded by a cladding material.

A ridge waveguide 10 (shown in FIG. 3) is understood herein to be a waveguide 10 comprising a core 20 in the shape of a ridge, extending over a length L, and coated in a cladding 31. The core 20 of the ridge waveguide 10 comprises a second cross-section $S_{c2}$ along a plane that is orthogonal to the first direction A. The second cross-section $S_{c2}$ can have a rectangular, triangular or semi-circular shape. However, the invention is not limited to any specific shape of the second cross-section $S_{c2}$.

The waveguide 10 further comprises an exit facet 50. The exit facet 50 can be planar and substantially orthogonal to the first direction A. Substantially orthogonal is understood herein to mean that the first direction A can have a small angular deviation relative to the direction that is normal (or orthogonal) to the first facet 50. The small angular deviation can lie in the range −5 to +5°.

The core 20 of the waveguide 10 is advantageously exposed to the external environment at the exit facet 50.

The external environment has a refractive index $n_0$. The external environment is, for example, air, and thus has a refractive index equal to 1.

The external environment can also be a coupling element connected to the waveguide 10 at the exit facet 50.

The exposure of the core 20 to the external environment allows the waveguide 10 to be easily coupled with other optical devices.

The exit facet 50 is one face of the waveguide 10 via which the light radiation, guided by the waveguide 10, is transmitted to the external environment. In other words, the exit facet 50 is a border between the external environment and the waveguide 10.

The core 20 of the waveguide 10 comprises a core material having a refractive index $n_g$ at the wavelength $\lambda$.

The cladding 31 of the waveguide 10 comprises a cladding material having a refractive index $n_g$ at the wavelength $\lambda$.

For simplicity purposes, in the description below, the expression "at the wavelength $\lambda$" will be omitted from the expression "refractive index $n_g$ at the wavelength $\lambda$".

Moreover, in order to contain the monochromatic or quasi-monochromatic light radiation having a central wavelength $\lambda$, the refractive index $n_c$ of the core material is greater than the refractive index $n_g$ of the cladding material.

The design of a planar or ridge waveguide 10 will not be described in this description since it falls under the capabilities of a person skilled in the art.

Advantageously, the waveguide 10 is a single-mode waveguide.

A single-mode waveguide is understood herein to be a waveguide in which a single optical mode of the wavelength λ can propagate. In this respect, a person skilled in the art can find in the document [1], cited at the end of the description, a description of the optical modes capable of propagating in the waveguide.

The waveguide 10 devoid of any filter blade 60 (the filter blade 60 being described in more detail in the description below), thus guides the quasi-monochromatic light radiation, having a central wavelength), in the first direction A, and transmits said radiation through the exit facet 50 of the waveguide 10 to the external environment, having a refractive index $n_s$, according to a transmission coefficient T.

The transmission coefficient T through the facet 50 of the waveguide 10 is the ratio between the intensity of the light radiation transmitted by the exit facet 50 and the intensity of the light radiation guided in the waveguide and incident on the exit facet 50.

The value of the transmission coefficient T is imposed by the refraction indices of the core material, cladding material and external environment. A person skilled in the art can easily determine the transmission coefficient T of a waveguide without the need to describe this notion in more detail in the description.

Advantageously, the core 20 can comprise at least one of the core materials chosen from the group consisting of: silicon, a silicon-germanium alloy, silicon nitride (of the chemical formula $Si_3N_4$), germanium and $TiO_2$.

Also advantageously, the cladding 31 can comprise at least one of the cladding materials chosen from the group consisting of: silicon, a silicon-germanium alloy, silicon oxide (of the chemical formula $SiO_2$), germanium, silicon nitride (of the chemical formula $Si_3N_4$), $TiO_2$, ZnS, $Al_2O_3$ and AlN.

The method according to the invention further comprises a step of forming a filter blade 60 in the waveguide 10.

A blade is understood herein to be a thin film comprising two main faces that are substantially parallel, and preferably parallel. The main faces are connected by a contour surface. Thus, as soon as the orientation of a blade is mentioned in this description, it refers to the manner in which the main faces thereof are oriented. In this respect, a blade arranged orthogonally to a direction means that said direction is orthogonal to the main faces of said blade. Similarly, a blade arranged parallel to a direction means that said direction is parallel to the main faces of said blade. Furthermore, the blade has a thickness $e_{slit}$ measured in the direction orthogonal to the main faces thereof.

The filter blade 60 can have a refractive index $n_5$.

The filter blade 60 is substantially parallel to the exit facet 50, and at a distance $e_{slab}$ from said facet 50.

It should now be noted that the filter blade 60 is arranged in the volume of the waveguide. A portion of the contour surface of the filter blade can be flush with an exposed face of the cladding 31.

In other words, the main faces of the filter blade 60 are not exposed to the external environment. Thus, the filter blade 60 lies in the path of the light radiation in the waveguide 10.

Thus, as soon as the filter blade 60 is arranged in the waveguide 10, a modification is seen affecting the transmission coefficient T of the waveguide 10 through the exit facet 50.

The transmission coefficient T can thus be adjusted to a value of a first transmission coefficient $T_1$ by inserting the filter blade 60 into the waveguide 10.

Moreover, the value of the first transmission coefficient $T_1$ depends on the following magnitudes: the effective refractive index of the mode ($n_{eff}$), the refractive index of the external environment ($n_0$), the refractive index of the filter blade ($n_s$), the thickness of the filter blade ($e_{slit}$), and the distance of the filter blade ($e_{slab}$) relative to the exit facet 50.

The filter blade 60 can comprise at least one of the materials chosen from the group consisting of: air, $SiO_2$, SiN, $Al_2O_3$ and AlN.

The filter blade 60 can be formed by an etching step.

For example, this can be a dry etching step using, for example, plasma. The dry etching step can be preceded by a photolithography step intended to delimit the pattern of the filter blade 60. These techniques are known by a person skilled in the art and are thus not described in the description of the invention.

Provided that the filter blade 60 comprises a solid material (i.e. a material other than air or a vacuum), the formation thereof involves a step of depositing said solid material in the cavity formed by etching, for example a chemical or physical vapour-phase deposition step.

The formation of the filter blade 60 by a deposition step can be followed by a chemical-mechanical polishing or CMP step in order to remove the excess material formed during the deposition step.

Advantageously, the filter blade 60 covers at least one cross-section $S_c$ of the core 20 of the waveguide 10.

The cross-section $S_c$ of the core 20 is the intersection of the core 20 with a plane perpendicular to the first direction A.

In the case of a planar waveguide 10, the cross-section $S_c$ is the first cross-section $S_{c2}$.

In the case of a ridge waveguide 10, the cross-section $S_c$ is the second cross-section $S_{c2}$.

Thus, provided that the filter blade 60 covers at least the cross-section of the core $S_c$, at least 80% of the surface of the optical mode guided by the waveguide 10 is covered by the filter blade 60.

In a particularly advantageous manner, the filter blade 60 extends in the cladding 31 of the waveguide 10. Also advantageously, the filter blade 60 covers at least all of the surface of the optical mode intended to be guided in the waveguide 10.

The optical mode is understood herein to be the surface in which 99% of the optical energy is situated. The optical energy density is defined by $0.5 \times \varepsilon \times (abs(E))^2$; where abs(E) is the norm of the electric field, ands is the local permittivity, defined as the local refractive index to the power of 2 ($\varepsilon = n^2$). The integral of the energy density over the surface of the mode equals 99% of the integral in the whole space (an infinite section 2D perpendicular to the waveguide is referred to as the whole space).

In a particularly advantageous manner, the filter blade 60 can be made of air or of a vacuum.

More specifically, as regards the manufacture of the filter blade 60 comprising air or a vacuum, there is no need to implement a step of forming thin films of dielectric and/or semi-conductive materials on the sides of the waveguide or of the optical device. Thus, the problems associated with the inhomogeneities in the chemical composition or thickness of the filter blade are not posed within the scope of this invention.

Moreover, the formation of the filter blade 60 can solely require an etching step.

For example, this can be a dry etching step using, for example, plasma. The dry etching step can be preceded by a photolithography step intended to delimit the pattern of the filter blade 60. These techniques are known by a person skilled in the art and are thus not described in the description of the invention.

Moreover, the air and the vacuum are little or not absorbent, and can thus be used in the wavelength ranges 3 μm-8 μm and 8 μm-14 μm. More specifically, there are no transparent materials in these wavelength ranges.

Figure 4:
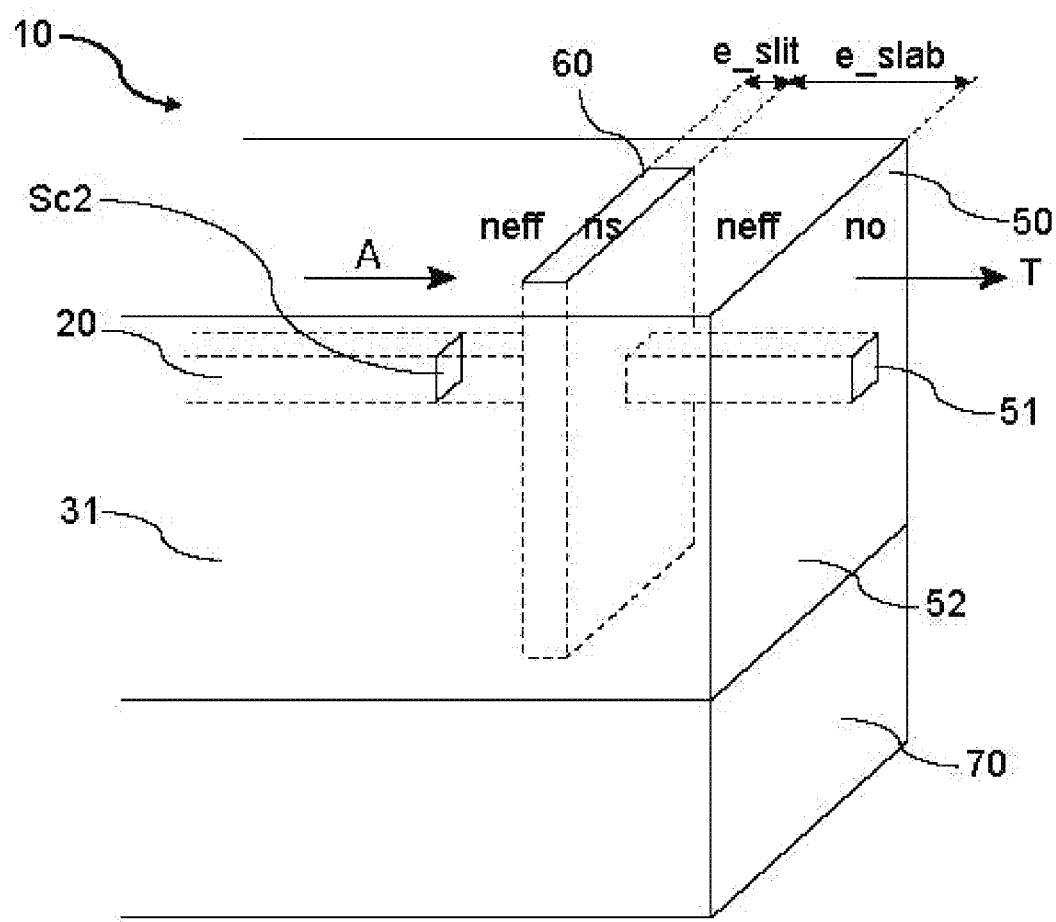
FIG. 4 is a diagram showing a perspective view of a ridge waveguide implementing a filter blade according to this invention, the filter blade being arranged in the waveguide, in the path of radiation capable of being guided by said waveguide.

The ridge waveguide 10 shown in FIG. 4 is considered as an example implementation of the method of manufacturing the filter for the waveguide. In this example, the waveguide 10 is a single-mode waveguide having a wavelength λ, and the effective refractive index of the mode is $n_{eff}$.

The core 20 of the ridge waveguide 10 comprises a second cross-section $S_{c2}$ that is square in shape (the example however is not limited to this cross-section shape and any other shape can be considered without the need to modify the description), and is surrounded by a cladding material. The first direction A is oriented in the direction in which the core 20 extends. The exit facet 50 comprises a core region 51 and a cladding region 52. The core region 51 is a cross-section of the core 20 exposed to the external environment at the level of the exit facet 50. The cladding region 52 is a cross-section of the cladding 31 exposed to the external environment at the level of the exit facet 50. The waveguide 10 can be formed on a substrate 70, for example made of silicon. The waveguide 10 can be formed by a combination of thin film deposition techniques by epitaxy, and of etching techniques intended to shape the ridge of the waveguide. In the example shown in FIG. 4, the filter blade 60 is arranged in the waveguide such that it covers the entire surface of the optical mode propagating in the waveguide 10.

This description will now analyse the influence of the parameters regarding the filter blade 60 on the transmission coefficient T of the waveguide 10. In this respect, the Applicant has shown that the transmission coefficient T of the waveguide 10 follows an analytical model in line with the following mathematical equation (1):

$$T = \frac{64 n_{eff}^3 n_s^2 n_0}{\left| (n_{eff} + n_0)[(n_{eff} + n_s)^2 - (n_{eff} - n_s)^2 A] - \atop (n_{eff}^2 - n_s^2)(n_{eff} - n_0)B(1-A) \right|^2} \quad \text{where} \quad (1)$$

$$A = e^{\frac{i4\pi n_s e_{slit}}{\lambda}} \quad (2)$$

$$B = e^{\frac{i4\pi n_{eff} e_{slab}}{\lambda}} \quad (3)$$

The mathematical equation (1) is thus used to calculate a map of the transmission coefficient T as a function of the magnitudes $e_{slit}$ and $e_{slab}$, and has been compared to a so-called FDTD digital model ("Finite Difference Time Domain"). In this respect, a person skilled in the art could view the document [3] cited at the end of the description.

Figures 5A, 5B:
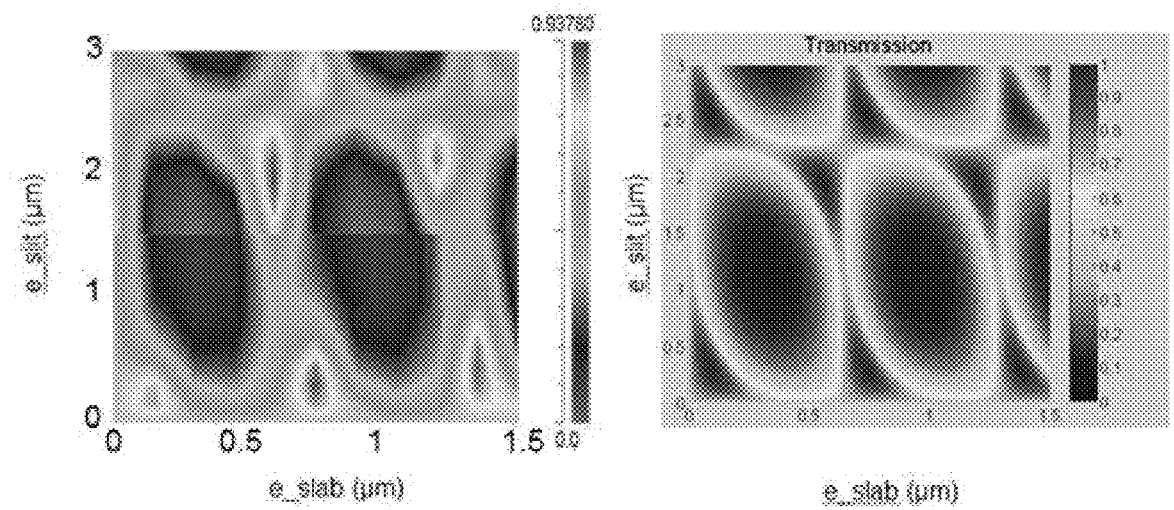
FIGS. 5a and 5b show a map of the transmission coefficient of a waveguide provided with a filter blade, for a wavelength $\lambda$, according to the invention, the map being calculated according to the digital method ("Finite Difference Time Domain Method" or "FDTD" (FIG. 5a) and according to the analytical model (FIG. 5b), the shades of grey indicating the amplitude of the transmission coefficient of the waveguide as a function of the thickness $e_{slit}$ (shown on the vertical axis) of the filter blade and of the distance $e_{slab}$, (shown on the horizontal axis) between said blade and the exit facet of the waveguide, FIGS. 6, 7 and 8 each show a map of the transmission coefficient of a waveguide provided with a filter blade, for a wavelength $\lambda$, according to one embodiment of the invention, the shades of grey indicating the amplitude of the transmission coefficient of the waveguide as a function of the thickness $e_{slit}$ (shown on the vertical axis) of the filter blade and of the distance $e_{slab}$, (shown on the horizontal axis) between said blade and the exit facet of the waveguide.

The comparison between the analytical model (1) and the FDTD model is shown in FIGS. 5a and 5b. FIGS. 5a and 5b show the map of the transmission coefficient T for a ridge waveguide 10. The core 20 of the waveguide is made of SiGe (comprising 40% Ge), and has a second square cross-section $S_{c2}$ of 3 μm*3 μm, the central wavelength λ measuring 4.5 μm. The cladding 31 is made of silicon. The effective refractive index of the mode is $n_{eff}$=3.5. The map of the transmission coefficient T of the waveguide 10 is determined for $e_{slit}$ values varying between 0 and 3 μm, and for $e_{slab}$ values varying between 0 and 1.5 μm (with the filter blade being made of air). The two maps can be seen to be very similar, which confirms the analytical model. It should also be noted that the analytical model allows the map of the transmission coefficient of the waveguide 10 provided with the filter blade 60 to be produced in a few seconds, whereas several days or even weeks are required to obtain the same result with the FDTD method.

The map shown in FIGS. 5a and 5b also very clearly shows that all values lying in the range 0 to 100% of the transmission coefficient $T_1$ of the waveguide 10 can be reached. Each value of the transmission coefficient $T_1$ is thus determined by at least one pair of values $e_{slit}$ and $e_{slab}$.

In other words, according to the invention, as a function of the target transmission coefficient $T_1$ value, there is at least one pair of values $e_{slit}$ and $e_{slab}$ that allow said target to be reached.

More particularly, regardless of the target transmission coefficient $T_1$ value, a filter blade 60 made of air or of a vacuum, associated with a given pair of values $e_{slit}$ and $e_{slab}$ can be implemented. An air blade or vacuum blade has the following advantages:

there is no need to look for a material having a given refractive index, the filter blade 60 thus being universal in nature, the air and the vacuum are not absorbent in the range of wavelengths between 3 and 14 μm, the filter blade 60 is homogeneous (with regard to the chemical composition and thickness thereof), unlike the known filter of the prior art discussed in the document [2], the filter blade 60 produces a transmission coefficient of 100%, also in the mid-wavelength infrared and long-wavelength infrared ranges (between 3 and 14 μm), which is not possible with the non-reflective filter presented in the document [2].

Figure 6:
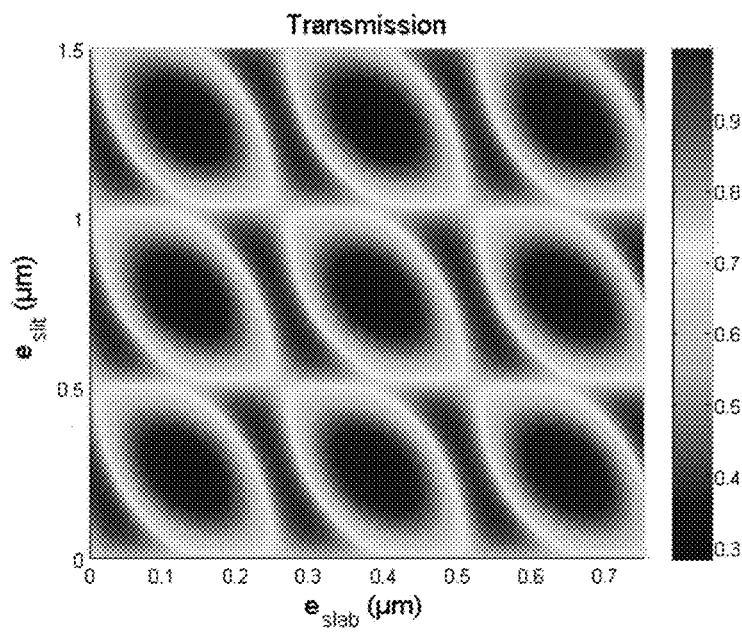
Figure 7:
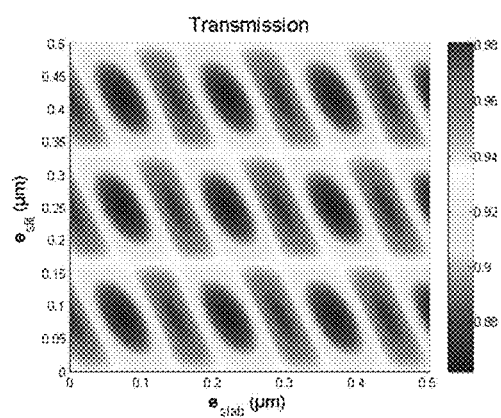
Figure 8:
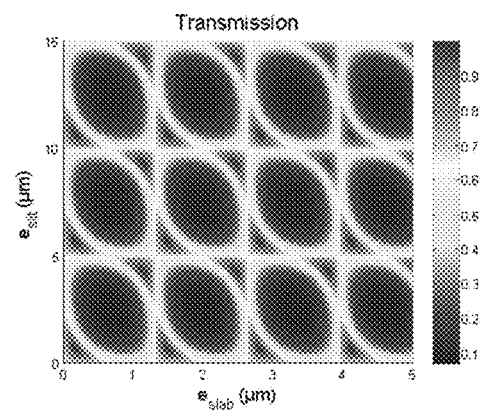

FIGS. 6, 7 and 8 show other maps of the transmission coefficient T for other ridge waveguides 10.

In FIG. 6, the core 20 of the waveguide is made of silicon and has a second cross-section measuring 300 nm*300 nm, the central wavelength λ measuring 1.55 μm. The cladding is made of silicon oxide. The effective refractive index of the mode is $n_{eff}$=3. The filter blade 60 comprises silicon oxide. The map of the transmission coefficient T of the waveguide 10 is determined for $e_{slit}$ values varying between 0 and 1.5 μm, and for $e_{slab}$ values varying between 0 and 0.75 μm.

In FIG. 7, the core 20 of the waveguide is made of silicon nitride and has a second cross-section measuring 250 nm*250 nm, the central wavelength λ measuring 0.5 μm. The cladding is made of silicon oxide. The effective refractive index of the mode is $n_{eff}$=1.7. The filter blade 60 comprises silica (silicon oxide, $n_s$=1.5). The map of the transmission coefficient T of the waveguide 10 is determined for $e_{slit}$ values varying between 0 and 0.5 μm, and for $e_{slab}$ values varying between 0 and 0.5 μm.

In FIG. 8, the core 20 of the waveguide is made of germanium and has a second cross-section measuring 3.5 μm*3.5 μm, the central wavelength λ measuring 10 μm. The cladding is made of SiGe. The effective refractive index of the mode is $n_{eff}$=3.8. The filter blade 60 comprises air. The map of the transmission coefficient T of the waveguide 10 is determined for $e_{slit}$ values varying between 0 and 15 μm, and for $e_{slab}$ values varying between 0 and 5 μm.

In these three scenarios, it is shown that the entire range of transmission coefficients T between 100% and values close to 0% (for example 0.5% or 1%) can be reached.

Within the scope of this invention, the formation of the filter blade 60 can be preceded by a step of selecting the transmission coefficient $T_1$ from a first set of values of transmission coefficients T. The value of the transmission coefficient $T_1$ is of course the value of the transmission coefficient T that we want the waveguide 10 to have. This value $T_1$ can lie in the range 0 to 100%. For example, provided that the intention is to transmit an optical signal to the external environment and limit the optical losses (in other words limit the spurious reflections), a $T_1$ value that is greater than the transmission coefficient $T_d$ of the waveguide 10 devoid of any filter blade 60 should advantageously be chosen.

Advantageously, the value of the coefficient $T_1$ can be greater than 80%, preferably greater than 90%, for example equal to 95% or 100%.

Still within the scope of this invention, the aforementioned first set of values of transmission coefficients T can be determined according to a set of values of first thicknesses $e_{slit}$ of the filter blade 60 and a set of first distances $e_{slab}$ of the filter blade 60 relative to the exit facet 50.

The set of first distances $e_{slab}$ can lie in the range 0 to 1.5 times the central wavelength $\lambda$ of the light radiation intended to be guided in the waveguide 10.

The set of values of first thicknesses $e_{slit}$ can lie in the range 0 to 1.5 times the central wavelength $\lambda$ of the light radiation intended to be guided in the waveguide 10.

Advantageously, the first set of values of transmission coefficients T is advantageously determined by a calculation, for example a mapping calculation with the mathematical equation (1). In other words, the selection of the pair of values $e_{slit}$ and $e_{slab}$ is carried out as a function of a target value $T_1$ identified on the transmission coefficient T map.

The waveguide 10 according to the invention can further comprise a LASER guide. The LASER guide is understood herein to be an element suitable for emitting LASER radiation. The gain medium of the laser can advantageously be included in the core 20 of the waveguide. The LASER guide is advantageously a solid LASER, such as a III-V semiconductor laser operating in the visible or short-wavelength infrared ranges, or a III-V quantum cascade laser operating in the mid- and long-wavelength infrared ranges. A solid LASER can also require an adjustment of the transmission coefficient T at the LASER radiation-emitting facet thereof (equivalent to the exit facet 50 of the waveguide). A solid LASER generally comprises two mirrors arranged at the two ends of a ridge waveguide.

One of the two mirrors, the first mirror, has a reflection coefficient of 100%, whereas the other mirror, the second mirror, has a non-zero transmission coefficient lying in the range 10 to 99%, for example 70%. The second mirror is the mirror from which the LASER radiation is emitted. Still within the scope of this invention, the laser guide can comprise a solid LASER (in this respect, a person skilled in the art can view the document [4]). The filter blade 60 is thus preferably made of air or of a vacuum. The values $e_{slit}$ and $e_{slab}$, are chosen such that the transmission coefficient T of the waveguide 10 at the level of the facet 50 lies in the range 10 to 99%, for example 70%. The combination of the exit facet 50 of the waveguide and the filter blade 60, arranged at the distance $e_{slab}$ relative to said exit facet 50, can be integrated into the second mirror.

The invention further relates to an optical device comprising:

the waveguide 10, comprising the core 20 having a refractive index $n_c$, for guiding the quasi-monochromatic light radiation, of a central wavelength $\lambda$, in the first direction A and transmitting said radiation through the exit facet 50 of the waveguide 10 to the external environment according to a transmission coefficient T, the exit facet 50 being substantially perpendicular to the first direction A, the filter blade 60 arranged in the waveguide 10, parallel to, and at a first distance $e_{slab}$ from the exit facet 50, the filter blade 60 having, in the first direction A, a first thickness $e_{slit}$, the first distance $e_{slab}$ and the first thickness $e_{slit}$ being adapted so that the transmission coefficient T of the waveguide 10 is equal to a first transmission coefficient $T_1$ at the central wavelength $\lambda$.

The optical device comprising the waveguide 10 and the filter blade can take on all of the characteristics described in the method of manufacturing the filter.

Thus, the invention describes a waveguide 10 comprising a filter blade 60 that is homogeneous and has an absorption coefficient that is sufficiently low or even zero, in order to pave the way for applications in the mid-wavelength infrared and long-wavelength infrared ranges.

Moreover, the manufacture of the filter blade 60 is simpler than the installation of a non-reflective filter on the exit facet.

REFERENCES

[1] Katsunari Okamoto, "Fundamentals of optical waveguides", ISBN: 978-0-12-525096-2,
[2] US 2013/0084038,
[3] K. S. Yee, "Numerical solution of initial boundary value problems involving Maxwell's equations in isotropic media", IEEE Trans. Antennas Propag. 14, 3, 302-307 (1966),
[4] T. Aellen et al., "Continuous-wave distributed-feedback quantum-cascade lasers on a Peltier cooler", APPLIED PHYSICS LETTERS 83, pp 1929-1931 (2003).

The invention claimed is:

1. An optical device comprising:
a waveguide, comprising a core having a first refractive index, for guiding quasi-monochromatic light radiation, of a central wavelength, in a first direction and transmitting the radiation through an exit facet of the waveguide to an external environment according to a transmission coefficient, the exit facet being substantially perpendicular to the first direction; and
a filter blade, arranged in the waveguide, parallel to the exit facet and at a first non-zero distance from the exit facet within a range of 0 to 1.5 times the central wavelength, the filter blade having, in the first direction, a first non-zero thickness within a range of 0 to 1.5 times the central wavelength, the first distance and the first thickness configured so that the transmission coefficient of the waveguide is equal to a first transmission coefficient at the central wavelength, the first transmission coefficient being greater than a transmission coefficient of the waveguide devoid of any filter blade,
wherein the filter blade is arranged in the waveguide such that it covers an entire surface of an optical mode propagating in the waveguide.

2. A device according to claim 1, wherein the waveguide is a planar waveguide, the core whereof is a layer inserted between two cladding layers, each of which comprises a cladding material having a second refractive index that is less than the first refractive index.

3. A device according to claim 2, wherein the core comprises a first cross-section along a plane that is orthogonal to the first direction, whereby the filter blade is substantially parallel to the first cross-section, and covers at least the first cross-section, the filter blade extending into the two cladding layers.

4. A device according to claim 1, wherein the core extends over a length that is parallel to the first direction, and has a second cross-section, rectangular in shape, whereby the core is surrounded by a cladding material having a third refractive index that is less than the first refractive index.

5. A device according to claim 4, wherein the filter blade is substantially parallel to the second cross-section, and covers at least the second cross-section, the filter blade extending into the cladding material.

6. A device according to claim 1, wherein the waveguide is a single-mode waveguide.

7. A method for manufacturing an optical device comprising:
   forming a waveguide, the waveguide comprising a core having a first refractive index, for guiding quasi-monochromatic light radiation, of a central wavelength, in a first direction and transmitting the radiation through an exit facet of the waveguide to an external environment according to a transmission coefficient, the exit facet being substantially perpendicular to the first direction; and
   forming a filter blade in the waveguide, parallel to the exit facet and at a first non-zero distance from the exit facet within a range of 0 to 1.5 times the central wavelength, the filter blade having, in the first direction, a first non-zero thickness within a range of 0 to 1.5 times the central wavelength, the first distance and the first thickness configured so that the transmission coefficient of the waveguide is equal to a first transmission coefficient at the central wavelength, the first transmission coefficient being greater than a transmission coefficient of the waveguide devoid of any filter blade,
   wherein the filter blade is arranged in the waveguide such that it covers an entire surface of an optical mode propagating in the waveguide.

8. A method according to claim 7, wherein the forming the filter blade is preceded by selecting the transmission coefficient from among a first set of values of transmission coefficients, the first set of values of transmission coefficients being determined according to a set of values of first thicknesses of the filter blade and a set of first distances of the filter blade relative to the exit facet, the first set of values of transmission coefficients being determined by a calculation.

9. A method according to claim 7, wherein the forming the filter blade comprises etching the waveguide, the etching comprising a dry etching operation.

10. A method according to claim 7, wherein the first transmission coefficient is greater than 80%.

11. A method according to claim 7, wherein the waveguide is a planar waveguide, the core whereof is a layer inserted between two cladding layers, each of which comprises a cladding material having a second refractive index that is less than the first refractive index.

12. A method according to claim 11, wherein the core comprises a first cross-section along a plane that is orthogonal to the first direction, whereby the filter blade is formed substantially parallel to the first cross-section, and covers at least the first cross-section, the filter blade also extending into the two cladding layers.

13. A method according to claim 7, wherein before forming the filter blade, the core extends over a length that is parallel to the first direction, and has a second cross-section, rectangular in shape, whereby the core is surrounded by a cladding material having a third refractive index that is less than the first refractive index.

14. A method according to claim 13, wherein the filter blade is substantially parallel to the second cross-section, and covers at least the second cross-section, the filter blade also extending into the cladding material.

* * * * *